(12) United States Patent
Takeuchi

(10) Patent No.: US 10,707,736 B2
(45) Date of Patent: Jul. 7, 2020

(54) RESOLVER STATOR

(71) Applicant: TOYOTA JIDOSHA KABUSHIKI KAISHA, Toyota-shi, Aichi-ken (JP)

(72) Inventor: Taketo Takeuchi, Nishio (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 57 days.

(21) Appl. No.: 15/939,537

(22) Filed: Mar. 29, 2018

(65) Prior Publication Data

US 2018/0287474 A1    Oct. 4, 2018

(30) Foreign Application Priority Data

Mar. 30, 2017  (JP) ................................ 2017-068133

(51) Int. Cl.
| | | |
|---|---|---|
| *H02K 24/00* | (2006.01) | |
| *G01D 5/20* | (2006.01) | |
| *H02K 11/225* | (2016.01) | |
| *H02K 5/26* | (2006.01) | |
| *G01D 3/08* | (2006.01) | |
| *F16B 19/02* | (2006.01) | |

(52) U.S. Cl.
CPC ............. *H02K 24/00* (2013.01); *F16B 19/02* (2013.01); *G01D 3/08* (2013.01); *G01D 5/2046* (2013.01); *G01D 5/2073* (2013.01); *H02K 5/26* (2013.01); *H02K 11/225* (2016.01)

(58) Field of Classification Search
CPC ........ H02K 5/06; H02K 11/21; H02K 11/225; H02K 29/06; H02K 29/12; F16L 9/02; G01D 5/20; F16B 19/02

USPC ......... 310/156.05, 254.1; 324/537, 545, 546, 324/207.13, 207.15
See application file for complete search history.

(56) References Cited

U.S. PATENT DOCUMENTS

| | | | |
|---|---|---|---|
| 2011/0169382 A1* | 7/2011 | Coleman .............. | G01D 5/2006 310/68 B |
| 2013/0106252 A1* | 5/2013 | Yanagida ............. | H02K 11/225 310/68 B |
| 2016/0161290 A1 | 6/2016 | Nagaishi | |

FOREIGN PATENT DOCUMENTS

| | | | |
|---|---|---|---|
| CN | 105393438 A | | 3/2016 |
| JP | 2013176265 A | * | 9/2013 |
| JP | 2015-023622 A | | 2/2015 |
| WO | 2015/008123 A1 | | 1/2015 |

OTHER PUBLICATIONS

Machine translation of JP-2013176265-A retrieved from Espacenet.*

* cited by examiner

*Primary Examiner* — Quyen P Leung
*Assistant Examiner* — Minki Chang
(74) *Attorney, Agent, or Firm* — Sughrue Mion, PLLC

(57) ABSTRACT

A resolver stator that is mounted on a target structure including a knock pin, the target structure having a hole, a portion of the knock pin being disposed in the hole, the resolver stator including: a stator core that has an engaging groove configured to be engaged with the knock pin, and the stator core includes a yoke; and a resolver cover covering the yoke in a central axis direction of the resolver cover, the resolver cover being made from metal and having a first cutout, the first cutout being disposed such that the first cutout overlaps at least a part of an end surface of the knock pin engaged with the engaging groove, at the center axial direction.

8 Claims, 3 Drawing Sheets

RESOLVER STATOR

INCORPORATION BY REFERENCE

The disclosure of Japanese Patent Application No. 2017-068133 filed on Mar. 30, 2017 including the specification, drawings and abstract is incorporated herein by reference in its entirety.

BACKGROUND

1. Technical Field

The disclosure relates to a stator of a resolver, especially to a structure of the stator.

2. Description of Related Art

There is a known resolver that detects a rotational position of a rotor such as a motor rotor rotating about an axis. For example, a resolver provided in a motor includes a resolver rotor that rotates together with a rotor of the motor, and a resolver stator that is disposed around the resolver rotor and is disposed so as to be fixed to a stator of the motor. By detecting a rotational position of the resolver rotor with respect to the resolver stator, it is possible to detect a position of the rotor of the motor with respect to the stator.

The resolver stator is fixed to a structure to which the stator of the motor is fixed, such as a case of the motor. To position the resolver stator with respect to the case, a knock pin can be used. In Japanese Unexamined Patent Application Publication No. 2015-023622 (JP 2015-023622 A) described below, a resolver stator (30) that is positioned with respect to a motor case (18) by using a knock pin (50) is described. The resolver stator (30) has a resin cover member (40) that covers a stator coil (38). In the cover member (40), a stopper part (58) is provided at a position corresponding to a rear end of the knock pin (50). The stopper part (58) suppresses the knock pin (50) from coming off. The reference numerals stated above in the parentheses are used in reference literature 1 below, and are not related to the reference numerals used in description of an embodiment of the application concerned.

SUMMARY

In a case where a metallic member, such as a metallic cover that covers a core of a resolver stator, is provided adjacent to the core, and the member suppresses a knock pin from coming off, and when a distance between the member and the knock pin is short, peripheral electromagnetic noise received by the knock pin enters the core of the resolver stator through the cover, and noise can be mixed with an output signal from the resolver.

The disclosure restrains a knock pin from coming off, and also restrains electromagnetic noise from entering from the knock pin.

As an example aspect of the present disclosure is a resolver stator that is mounted on a target structure including a knock pin, the target structure having a hole, a portion of the knock pin being disposed in the hole. The resolver stator includes: a stator core that has an engaging groove configured to be engaged with the knock pin, and the stator core includes a yoke; and a resolver cover covering the yoke in a central axis direction of the resolver cover, the resolver cover being made from metal and having a first cutout, the first cutout being disposed such that the first cutout overlaps at least a part of an end surface of the knock pin engaged with the engaging groove, in the central axis direction.

As an example aspect of the present disclosure is a resolver stator that is mounted on a target structure including a knock pin, the target structure having a hole, a portion of the knock pin being disposed in the hole. The resolver stator includes: a stator core having an engaging groove configured to be engaged with the knock pin; and a metallic fixing plate that is screwed and joined to a bolt configured to pass through the target structure and the stator core from a back surface of the target structure, the fixing plate being configured to sandwich and fix the stator core together with the target structure. The fixing plate has a second cutout, and the second cutout is disposed such that the second cutout overlaps at least a part of an end surface of the knock pin engaged with the engaging groove, in a central axis direction of the fixing plate.

An area of the first cutout may be 40% or smaller of an area of the knock pin end surface. An area of the second cutout may be 40% or smaller of an area of the knock pin end surface.

The first cutout may be disposed in the resolver cover such that the first cutout is separated from the knock pin end surface. The second cutout may be disposed in the fixing plate such that the second cutout is separated from the knock pin end surface.

A clearance between the knock pin end surface and the first cutout may be smaller than a length of the portion at which the knock pin is disposed in the hole. A clearance between the knock pin end surface and the second cutout may be smaller than a length of the portion at which the knock pin is disposed in the hole.

Since the knock pin facing part faces only a part of the knock pin end surface, it is possible to restrain entrance of electromagnetic noise from the knock pin while the knock pin is suppressed from coming off.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
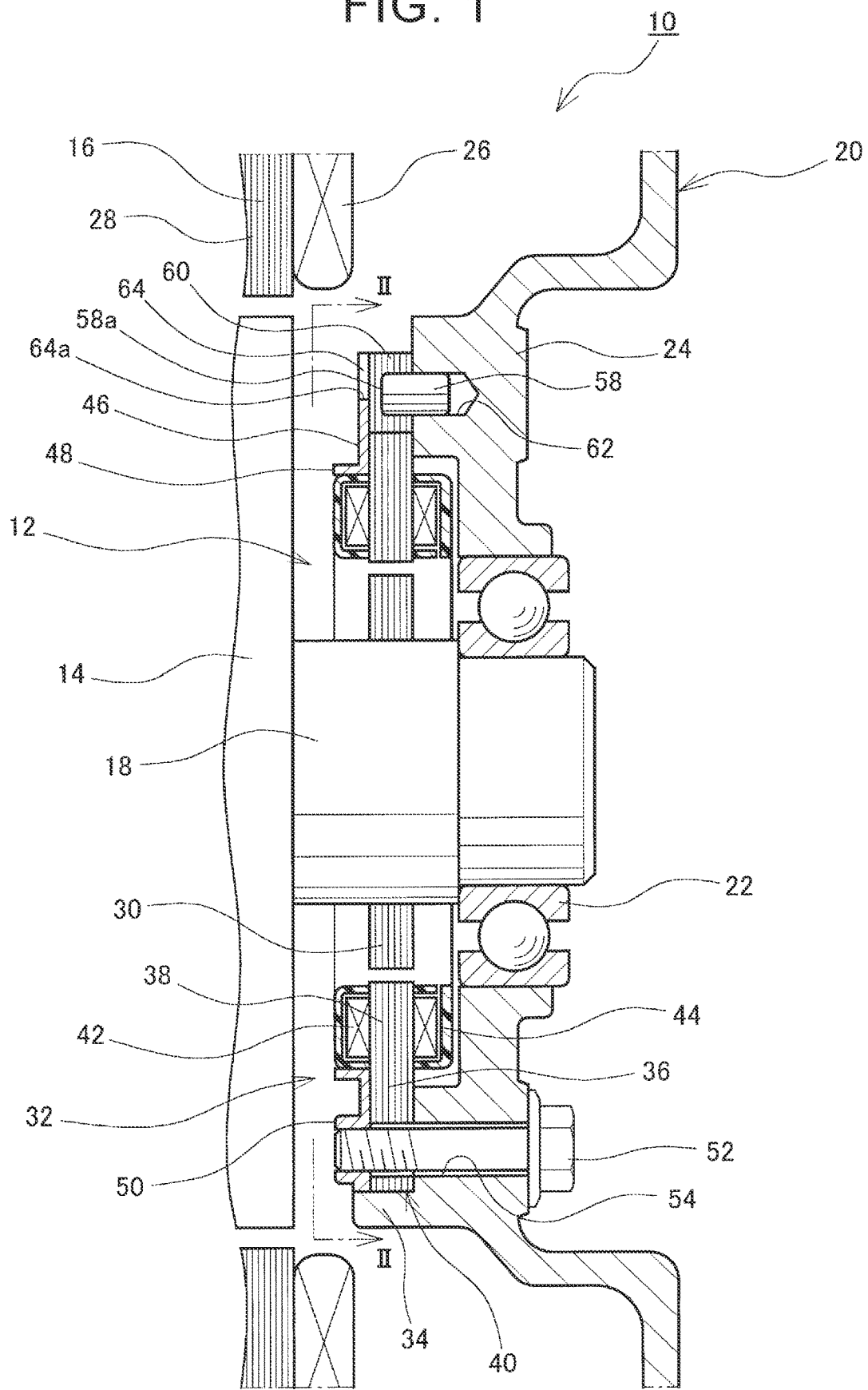
FIG. 1 is a sectional view of a schematic structure of a resolver according to the disclosure and of a periphery of the resolver.

Hereinafter, an embodiment of the disclosure is described with reference to the drawings. FIG. 1 is a sectional view of a resolver 12 provided in a motor 10. Only a structure of the motor 10 in a periphery of the resolver 12 is shown.

The motor 10 includes a motor rotor 14, and a motor stator 16 that is arranged so as to surround the motor rotor 14. The motor rotor 14 is joined to a rotor shaft 18 that serves as an output shaft of the motor 10, and the motor rotor 14 and the rotor shaft 18 rotate integrally. Both the motor rotor 14 and the motor stator 16 are housed in a motor case 20. The motor case 20 includes an end case 24. In the end case 24, a bearing 22 is disposed. The bearing 22 supports the rotor shaft 18 so that the rotor shaft 18 is able to rotate. Although FIG. 1 shows a first end of the rotor shaft 18 only, a second end of the rotor shaft 18 is also supported by a bearing so that the rotor shaft 18 is able to rotate. The motor stator 16 includes a motor coil 26, and a motor stator core 28 around which the motor coil 26 is wound, and the motor stator 16 is fixed to the motor case 20.

The resolver 12 includes a resolver rotor 30 fixed to the rotor shaft 18, and a resolver stator 32 that is mounted and fixed onto the motor case 20, especially onto the end case 24. The resolver rotor 30 has an elliptical plate shape, and a center of rotation of the elliptical resolver rotor 30 is located on an axis of rotation of the rotor shaft 18. As the rotor shaft 18 rotates, the resolver rotor 30 also rotates integrally. The resolver rotor 30 is formed by laminating electrical steel sheets in a direction of the axis of rotation. The resolver stator 32 has a generally circular shape, and is disposed so as to surround an outer periphery of the resolver rotor 30. Further, the resolver stator 32 is disposed so that the resolver stator 32 is housed radially inward of a plurality of arc walls 34 provided in the end case 24 (see FIG. 2 and FIG. 3). The arc walls 34 are disposed on the same circumference about the axis of rotation of the rotor shaft 18, and an outer peripheral side surface of the resolver stator 32 comes into contact with inner wall surfaces of the arc walls 34. Thus, a position of the resolver stator 32 in the radial direction is decided.

The resolver stator 32 includes a stator core 40, and resolver coils 42. The stator core 40 has a circular yoke portion (yoke) 36, and teeth 38 that extend inwardly from an inner periphery of the yoke portion 36, and the resolver coils 42 are mounted so that the resolver coils 42 are wound around the teeth 38. The stator core 40 is formed by laminating electrical steel sheets in a direction of an axis of rotation of the resolver rotor 30. The plurality of teeth 38 is disposed on the inner periphery of the yoke portion 36 along a circumferential direction.

The resolver coils 42 include three kinds of coils that are an excitation coil and two detecting coils. The two detecting coils are mounted on the two teeth 38, respectively, the two teeth 38 being disposed at intervals of electric angle of 90° of the motor 10. When alternating current is applied to the excitation coil, current is induced in the two detecting coils.

When the resolver rotor 30 rotates with rotation of the rotor shaft 18, a gap between an outer peripheral surface of the elliptical resolver rotor 30 and distal ends of the teeth of the stator core 40 changes periodically. Therefore, current induced in the detecting coil changes periodically. From the changes of current flowing in the detecting coils, a rotational position of the resolver rotor 30 with respect to the resolver stator 32 is calculated. Since the resolver stator 32 is fixed to the motor case 20, and the resolver rotor 30 rotates integrally with the motor rotor 14, the resolver 12 is able to detect a rotational position of the motor rotor 14 based on the motor case 20.

A shape of the resolver rotor 30 is not limited to the above-mentioned ellipse, and may be any shape as long as a gap between the outer peripheral surface of the resolver rotor 30 and the distal ends of the teeth of the stator core 40 changes periodically with rotation. For example, the resolver rotor 30 may have a disk shape having a center that is displaced from the center of rotation.

At least a part of the resolver coil 42 is housed in a coil case 44. In the resolver 12, the coil case 44 has a circular shape along the stator core 40, and is disposed on the front and back of the stator core 40. The coil case 44 may be made from resin.

A resolver cover 46 is disposed on a surface on the opposite side of the end case 24 so that the resolver cover 46 covers the yoke portion 36 of the resolver stator 32. In other words, the resolver cover 46 covers the yoke portion 36 in a central axis direction of the resolver cover 46. A material for the resolver cover 46 is metal, and may be steel in particular. The resolver cover 46 has a circular plate shape that corresponds to the yoke portion 36, and a flange 48 is provided in an inner peripheral edge of the resolver cover 46. The flange 48 comes into contact with an outer peripheral surface of the coil case 44. Further, outer peripheral edges of the resolver cover 46 and the yoke portion 36 coincide with each other, and both of the outer peripheral edges are in contact with the inner wall surfaces of the arc walls 34. In the resolver cover 46, a boss portion 50 having a tapped hole is provided. A threaded portion of a bolt 52 is screwed into the tapped hole of the boss portion 50. The bolt 52 penetrates from a back surface of the end case 24. In the end case 24, a through-hole 54 for the bolt 52 to pass through is formed, and a long hole 56 for the bolt 52 to pass through is also formed in the stator core 40 (see FIG. 2). The long hole 56 extends in a circumferential direction, and thus allows the resolver stator 32 to move in an angular range in the circumferential direction. Once the bolt 52 is fastened, the stator core 40 is sandwiched between the resolver cover 46 and the end case 24 and fixed to the motor case 20. The resolver 12 is fixed by using the three bolts 52. As described above, the resolver cover 46 functions as a fixing plate that sandwiches and fixes the stator core 40 together with the motor case 20.

Figure 2:
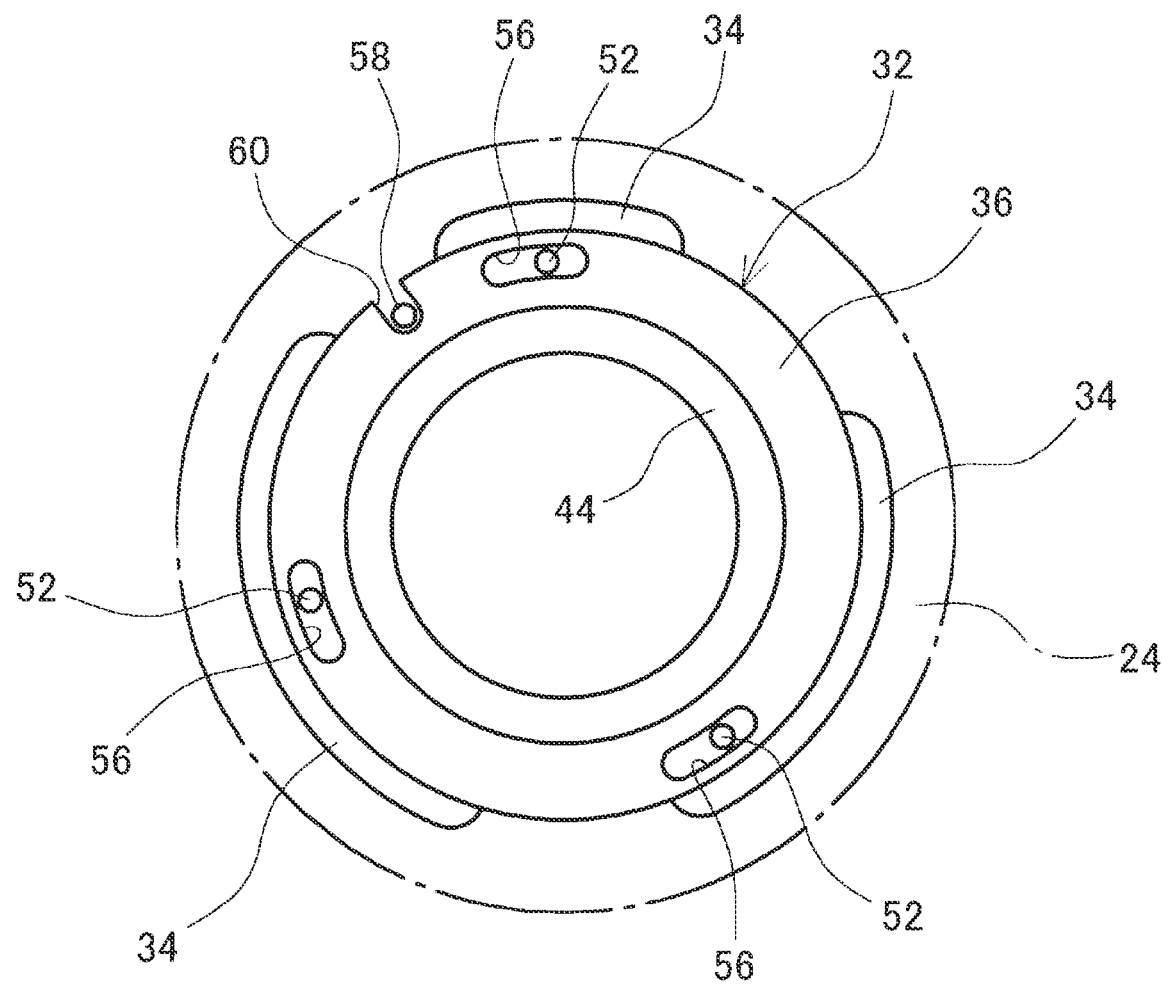
FIG. 2 is a view of a resolver stator and a periphery of the resolver stator, the view being taken in the direction of arrows II and showing a state where a resolver cover is removed.
Figure 3:
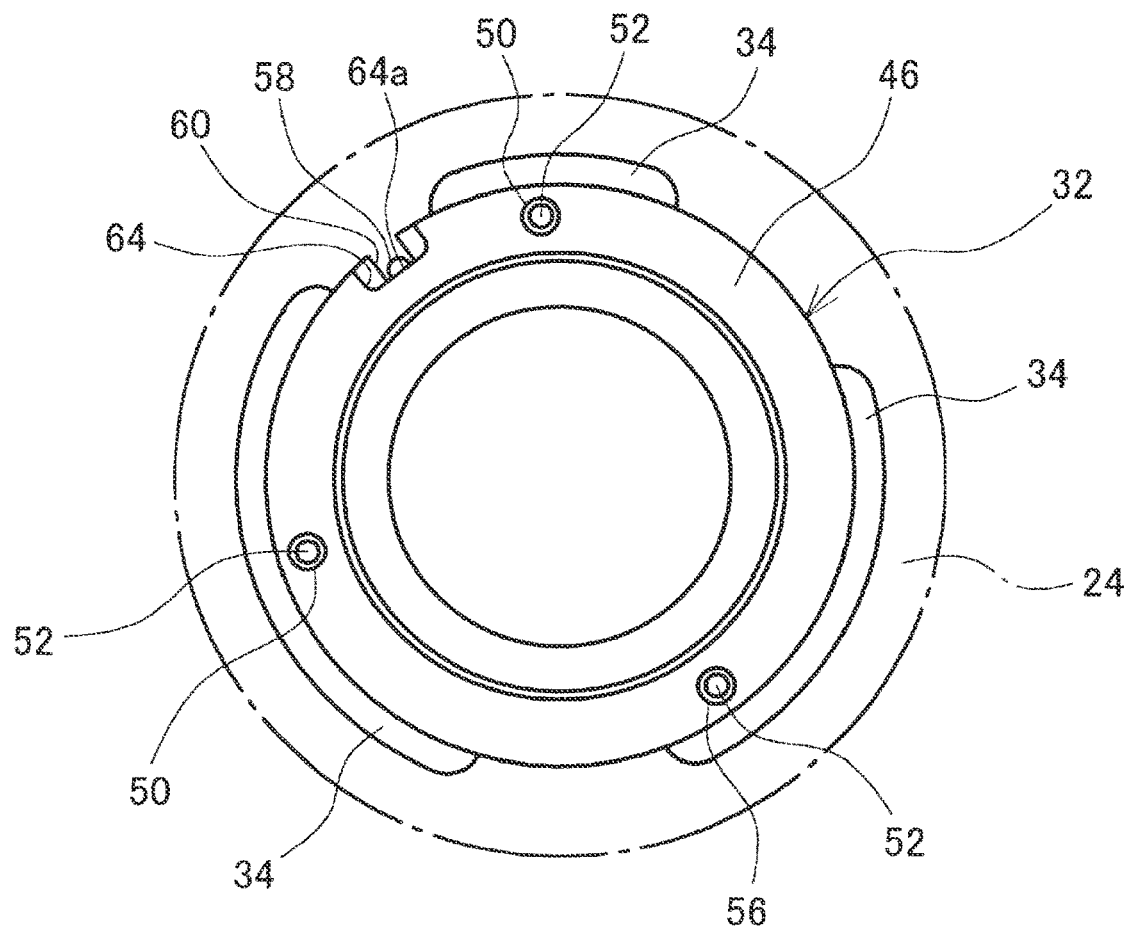
FIG. 3 is a view of the resolver stator with the resolver cover mounted in FIG. 2.

FIG. 2 and FIG. 3 are views of the resolver stator 32 and a periphery of the resolver stator 32 seen from a direction of arrows II shown in FIG. 1. FIG. 2 shows a state in which the resolver cover 46 is removed. Hereinafter, description is given with reference to FIG. 1, and FIGS. 2, 3.

In the stator core 40, an engaging groove 60 is provided. The engaging groove 60 is engaged with a knock pin 58 that is erected from the end case 24. The engaging groove 60 is formed radially inwardly from the outer peripheral edge of the yoke portion 36, and is also provided over an entire thickness direction of the yoke portion 36 (a direction along an axis of rotation of the motor rotor). The knock pin 58 is inserted in a joining hole (hole) 62 provided in the end case 24, and is erected so that one end of the knock pin 58 projects from the end case 24. The knock pin 58 has a columnar shape and a material thereof may be metal, particularly steel. Dimensions of the knock pin 58 and the engaging groove 60 in the circumferential direction are set so that a clearance is made between the knock pin 58 and the engaging groove 60. Thus, it is possible to move the resolver stator 32 slightly in the circumferential direction in a state where the bolt 52 is loosened a little bit and the resolver stator 32 is temporarily fixed. Accordingly, it is possible to make fine adjustments of a position of the resolver stator 32 in the circumferential direction.

At a position of the resolver cover 46, the position corresponding to the knock pin 58 and the engaging groove 60, a cutout (a first cutout, a second cutout) 64 is provided inwardly from the outer peripheral edge of the resolver cover 46. A bottom edge 64a of the cutout 64 extends in the circumferential direction, and the cutout 64 is formed so that the bottom edge 64a goes across an end surface 58a of the knock pin 58. Thus, the resolver cover 46 faces a part of the knock pin end surface 58a, and the remaining part of the knock pin end surface 58*a* is exposed without being covered by the resolver cover 46. That is, the part of the resolver cover 46, the part facing the knock pin (a knock pin facing part), faces only a part of the knock pin end surface 58*a*. In the other words, the cutout 64 is disposed such that the cutout 64 overlaps at least a part of an end surface of the knock pin 58*a* engaged with the engaging groove 60, at the center axial direction of the resolver cover 46.

Since the resolver cover 46 faces the knock pin end surface 58*a*, the knock pin 58 is suppressed from coming off from the joining hole 62. Even when the knock pin 58 is fixed to the joining hole 62 by press fitting, it is still conceivable that the knock pin 58 comes off depending on conditions. For example, when the motor case 20 is made from an aluminum alloy, and the knock pin 58 is made from general steel, the knock pin 58 can be in a loose-fit state due to thermal expansion caused by heat generation in the motor. A coefficient of thermal expansion of an aluminum alloy is larger than that of general steel, and, when temperature becomes high, an inner diameter of the joining hole 62 expands and becomes larger than an outer diameter of the knock pin 58. Therefore, these fitting dimensions are changed from a close-fit state to a loose-fit state, thus causing looseness. Therefore, it is possible that the knock pin 58 comes off. In a case where the motor 10 is installed in a vehicle, there are instances where the knock pin becomes loose due to vibration of the vehicle. In order to address falling of the knock pin 58, the part that faces the knock pin end surface 58*a* is provided in the resolver cover 46. Thus, this part presses the end of the knock pin 58 and suppresses the knock pin 58 from coming off. A clearance between the knock pin end surface 58*a* and the resolver cover 46 that faces the knock pin end surface 58*a* is set to be smaller than a depth at which the knock pin 58 is embedded in the joining hole 62. Accordingly, it is possible to suppress the knock pin 58 from coming off.

When current flows in the motor coil 26 disposed in the periphery of the resolver 12, a fluctuating magnetic field is generated in a periphery, and, there are instances where the magnetic field influences a magnetic flux induced in the stator core 40. Because the resolver cover 46 is made from metal, an outside magnetic field caused by the motor 10 may be blocked to some extent. Meanwhile, there are instances where the knock pin 58 functions like an antenna and amplifies noise that is caused by an outside magnetic field. The noise can enter the stator core 40 through the resolver cover 46. The noise degrades detection accuracy for a rotational position of the motor rotor 14.

In the resolver 12, since the resolver cover 46 faces only a part of the knock pin end surface 58*a*, an amount of noise that enters is reduced. Since an area where the resolver cover 46 and the knock pin end surface 58*a* face each other is small, it is possible to reduce noise entering the resolver cover 46 from the knock pin 58 in comparison with a case where the resolver cover 46 faces the entire knock pin end surface 58*a*. An area where the knock pin end surface 58*a* and the knock pin facing part face each other, that is, each an area of the first cutout and the second cutout is 40% or smaller of the overall area of the knock pin end surface 58*a*. Further, it is preferred that the resolver cover 46 is separated from the knock pin end surface 58*a*. As the resolver cover 46 is separated from the knock pin end surface 58*a*, entry of noise is also restrained.

Figure 4:
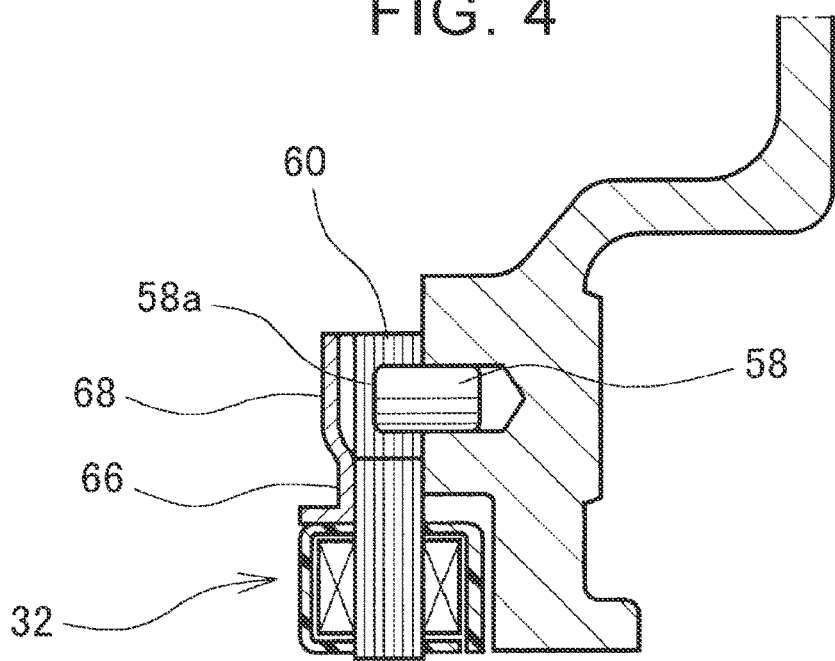
FIG. 4 is a view of another form of a resolver cover.

FIG. 4 is a view of another form for restraining entry of noise. In this form, a shape of a resolver cover is different from that of the foregoing resolver cover 46. The rest of the structure is similar to that described in the foregoing. The resolver cover 66 in this form has a separated portion 68, instead of the foregoing cutout 64. The separated portion 68 is bent and separated further from a knock pin end surface 58*a* in an axis direction of a knock pin than the rest of the resolver cover 66. Thus, a distance between the knock pin end surface 58*a* and the resolver cover 66 becomes longer. Therefore, compared to a flat resolver cover without the separated portion 68, noise entering the resolver cover 66 from the knock pin 58 is reduced. In this case, a distance between the knock pin end surface 58*a* and the separated portion 68 of the resolver cover 66 facing the knock pin end surface 58*a* is set to be smaller than a depth at which the knock pin 58 is embedded into a joining hole 62. Thus, it is possible to suppress the knock pin 58 from coming off.

What is claimed is:

1. A resolver stator that is mounted on a target structure including a knock pin, the target structure having a hole, a portion of the knock pin being disposed in the hole,
   the resolver stator comprising:
   a stator core that has an engaging groove configured to be engaged with the knock pin, and the stator core includes a yoke; and
   a resolver cover covering the yoke in a central axis direction of the resolver cover, the resolver cover being made from metal and having a first cutout, the first cutout being disposed such that the first cutout overlaps at least a part of an end surface of the knock pin engaged with the engaging groove, in the central axis direction,
   wherein the first cutout extends radially inward from an outer peripheral edge of the resolver cover towards a central axis of the resolver cover.

2. The resolver stator according to claim 1, wherein an area of the first cutout is 40% or smaller of an area of the knock pin end surface.

3. The resolver stator according to of claim 1, wherein the first cutout is disposed in the resolver cover such that the first cutout is separated from the knock pin end surface.

4. The resolver stator according to claim 3, wherein a clearance between the knock pin end surface and the first cutout is smaller than a length of the portion at which the knock pin is disposed in the hole.

5. A resolver stator that is mounted on a target structure including a knock pin, the target structure having a hole, a portion of the knock pin being disposed in the hole,
   the resolver stator comprising:
   a stator core having an engaging groove configured to be engaged with the knock pin; and
   a metallic fixing plate that is screwed and joined to a bolt configured to pass through the target structure and the stator core from a back surface of the target structure, the fixing plate being configured to sandwich and fix the stator core together with the target structure,
   wherein the fixing plate has a second cutout, and the second cutout is disposed such that the second cutout overlaps at least a part of an end surface of the knock pin engaged with the engaging groove, in a central axis direction of the fixing plate; and
   the second cutout extends radially inward from an outer peripheral edge of the fixing plate towards a central axis of the fixing plate.

6. The resolver stator according to claim 5, wherein an area of the second cutout is 40% or smaller of an area of the knock pin end surface.

7. The resolver stator according to claim 5, wherein
the second cutout is disposed in the fixing plate such that
the second cutout is separated from the knock pin end
surface.

8. The resolver stator according to claim 7, wherein
a clearance between the knock pin end surface and the
second cutout is smaller than a length of the portion at
which the knock pin is disposed in the hole.

* * * * *